(12) United States Patent
Worrall et al.

(10) Patent No.: US 7,411,946 B2
(45) Date of Patent: Aug. 12, 2008

(54) NETWORK MONITOR AND METHOD

(75) Inventors: Alexander Carl Worrall, Denmead (GB); Brian R. Carter, Bognor Regis (GB); Garry Widley, Kinross (GB)

(73) Assignee: Xyratex Technology Limited, Hampshire (GB)

( * ) Notice: Subject to any disclaimer, the term of this patent is extended or adjusted under 35 U.S.C. 154(b) by 499 days.

(21) Appl. No.: 10/524,528

(22) PCT Filed: Jul. 30, 2003

(86) PCT No.: PCT/GB03/03210

§ 371 (c)(1),
(2), (4) Date: Oct. 26, 2005

(87) PCT Pub. No.: WO2004/015921

PCT Pub. Date: Feb. 19, 2004

(65) Prior Publication Data

US 2006/0153177 A1  Jul. 13, 2006

Related U.S. Application Data

(60) Provisional application No. 60/402,704, filed on Aug. 13, 2002.

(51) Int. Cl.
*H04L 12/50* (2006.01)
(52) U.S. Cl. ................................. 370/366; 370/535

(58) Field of Classification Search ............... 370/366, 370/365, 535, 536, 542
See application file for complete search history.

(56) References Cited

U.S. PATENT DOCUMENTS

| 4,064,360 | A | * | 12/1977 | Koenig | 178/3 |
| 5,864,486 | A | * | 1/1999 | Deming et al. | 716/17 |
| 6,047,321 | A | | 4/2000 | Raab et al. | |

FOREIGN PATENT DOCUMENTS

| EP | 0 724 344 A2 | 7/1996 |
| EP | 0 661 848 B1 | 9/2001 |
| WO | WO 00/30293 | 5/2000 |

* cited by examiner

*Primary Examiner*—Brenda Pham
(74) *Attorney, Agent, or Firm*—Pillsbury Winthrop Shaw Pittman LLP

(57) ABSTRACT

A network monitor that taps data from a network link has first and second interfaces that allow the network monitor to be connected in-line in the network link between two network devices. The monitor has first and second programmable logic devices. The programmable logic devices are arranged to receive parallel data output by the interfaces and to process said data for network analysis purposes. Each programmable logic device is controllable so as to selectively pass a copy of the received parallel data to the other programmable logic device so that the network monitor can operate in in-line mode and not to pass a copy of the received parallel data to the other programmable logic device so that the network monitor can operate in end station mode.

13 Claims, 5 Drawing Sheets

NETWORK MONITOR AND METHOD

CROSS REFERENCE TO RELATED APPLICATION

Figure 1:
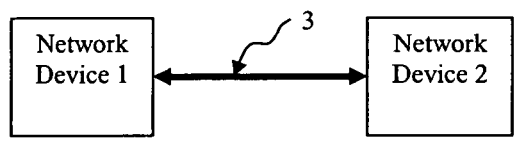

This is the U.S. National Stage of PCT/GB2003/003210, filed Jul. 30, 2003, which in turn claims priority to U.S. Provisional Patent Application Ser. No. 60/402,704, filed Aug. 13, 2002, both of which are incorporated herein in their entirety by reference.

The present invention relates to a network monitor and method.

Network monitoring systems analyse frames or packets of data as they pass through a network. The medium on which the data is carried is typically optical fibre or copper cable. The network monitor requires access to this medium in order to obtain visibility of the data passing through it. This requires the network monitor to be placed either in-line with the network link or on the span port output of a network switch or router. These connection methods are shown schematically in FIGS. 1(a) to 1(c). In particular, in FIG. 1(a) there is shown two network devices 1,2 connected by a link 3. In FIG. 1(b) there is shown an in-line connection of a network monitor 4 between the two network devices 1,2. In FIG. 1(c) there is shown the connection of the network monitor 4 to the span port output 5 of a network switch or router 6. The method of gaining access to data on the network link is commonly referred to as "tapping".

In-line tapping may be achieved using passive or active tapping methods. Both of these methods require that the insertion into the network be unobtrusive so as not to affect the transmission of data between the devices on the network. An active tap re-drives the network data passing though it, typically using a retimer circuit which regenerates the signal, restoring signal amplitude and timing, thus restoring signal integrity such that the ongoing signal passed back to the network is not degraded. Thus, an active tap may have to buffer and re-time the data in order to pass data between the two network segments. A passive tap does not provide for any regeneration of the signal.

Active tapping of optical Gigabit Ethernet networks has been achieved using serial loopback or port-bypass features of serialiser-deserialiser (SERDES) devices in the front-end portion of the network monitor. This type of implementation is shown schematically in FIG. 2. The optical fibres 10 from the two sides of the network link are plugged into gigabit interface converters (GBICs) 11 of the network monitor 3, which convert the optical data stream into high-speed serial electrical signals. These signals are passed to the SERDES devices 12, which loop the serial data back to the opposite channel of the network monitor 3, which re-drives the data back onto the network link, whilst providing a copy of the data, in parallel form, to the FPGA programmable devices 13 that process the data.

Figure 2:
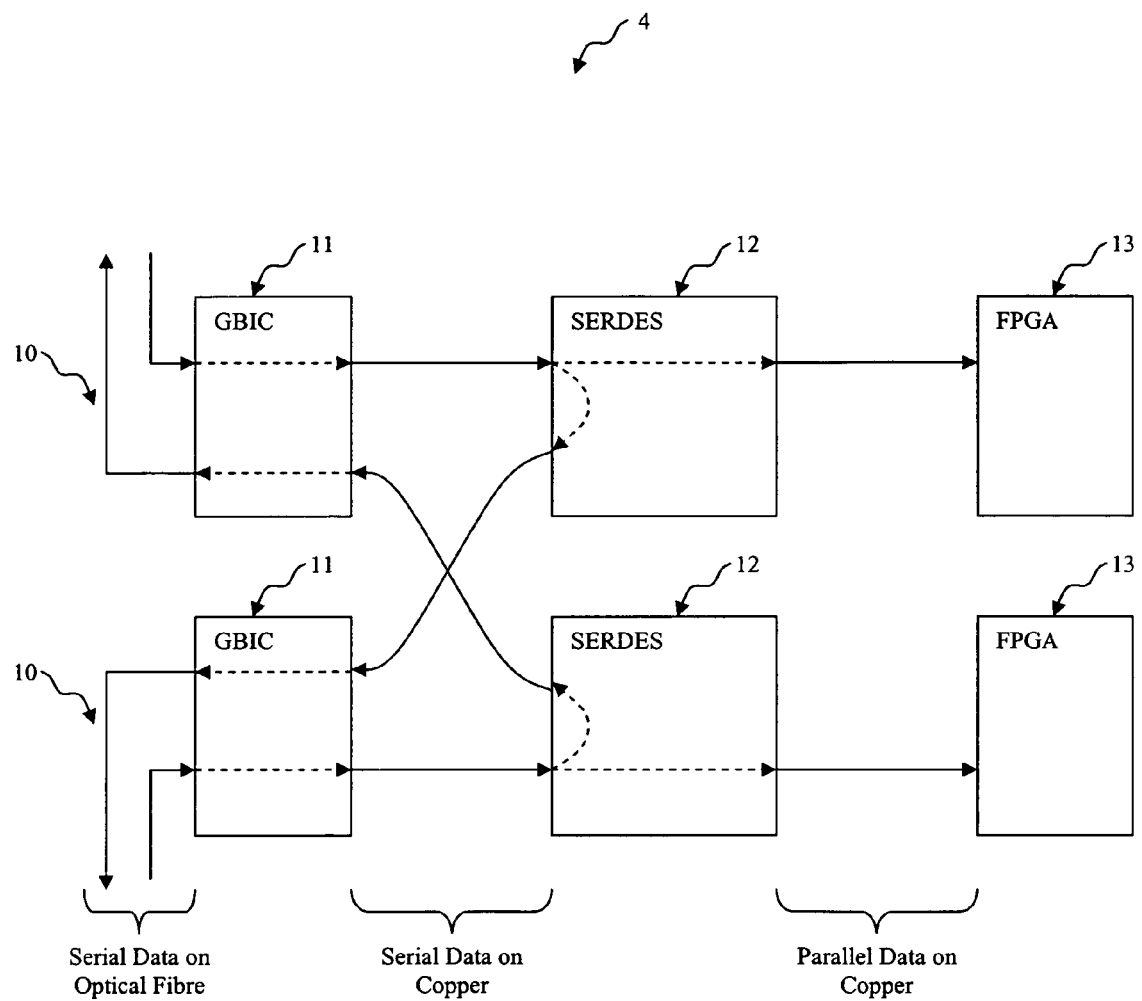

Although active tapping has been employed to optical network structures in manners such as that shown in FIG. 2, the use of high-speed serial loopback or port bypass tends to limit the network monitor 3 to having a fixed operation in either an in-line mode or end station mode. This is due to the need to connect and disconnect the crossover paths between the two sides of the monitor 3, to provide either a data path though the monitor 3 for in-line mode or to terminate the data path in the monitor 3 for end station mode. The constraint is due to the lack of cost-effective means to reliably switch high-speed electrical signals on the printed circuit board of the monitor 3, whilst maintaining good signal integrity. Moreover, in practice each implementation of this type of active tap architecture usually only supports one network speed, therefore limiting the scope of the product. This is typically due to the speed constraints on the serial loopback features of the SERDES devices 12.

Passive tapping of 10 and 100 Base-T Ethernet networks, which operate on Category 5 twisted pair copper cables, has been achieved. However, 1000 Base-T, the copper implementation of Gigabit Ethernet, has not been possible due to the signalling techniques employed on the network link. These enable simultaneous full-duplex data transmissions on each twisted pair, unlike 10 and 100 Base-T which use separate pairs for transmit and receive signals. Complex signalling techniques are also likely to be employed in the forthcoming 10 Gigabit network physical layer which will be referred to as 10 GBase-T. Therefore, an active tap is likely to be the only feasible method of accessing networks which use complex signalling techniques.

According to a first aspect of the present invention, there is provided a network monitor that taps data from a network link between two network devices, the network monitor comprising: first and second interfaces that allow the network monitor to be connected in-line in a network link between two network devices and to receive serial data therefrom and to transmit serial data thereto, each interface providing for serial-to-parallel conversion of data such that serial data received from a said network link at the interface is output as parallel data, and each interface providing for parallel-to-serial conversion of data such that parallel data received at the interface is output as serial data for transmission to a said network link; and, first and second programmable logic devices, the first programmable logic device being arranged to receive parallel data output by the first interface and to process said data for network analysis purposes, the second programmable logic device being arranged to receive parallel data output by the second interface and to process said data for network analysis purposes, each programmable logic device being controllable so as to selectively pass a copy of the received parallel data to the other programmable logic device so that the network monitor can operate in in-line mode and not to pass a copy of the received parallel data to the other programmable logic device so that the network monitor can operate in end station mode, the second programmable logic device being arranged to pass the copy of the parallel data received from the first programmable logic device to the second interface for parallel-to-serial conversion and for transmission of the serial data back to a said network link when the network monitor is operating in in-line mode, the first programmable logic device being arranged to pass the copy of the parallel data received from the second programmable logic device to the first interface for parallel-to-serial conversion and for transmission of the serial data back to a said network link when the network monitor is operating in in-line mode.

The use of programmable logic devices to perform the data connection between two channels provides flexible control over the routing of the data as their programmability allows their function to be changed during normal operation. This is particularly useful as it allows the network monitor to dynamically switch between operating as an in-line or end station monitoring device. In the preferred embodiment, standard interfaces, such as physical layer (PHY) ICs, are used, which provide a cost-effective method of providing an interface to allow the network monitor to be interfaced with a network link operating at several different speeds with different signalling technologies. The preferred embodiment of the present invention enables active tapping of data from any serial data network protocol and particularly an Ethernet network operating at 10, 100 and 1000 Base-T with data rates of 10, 100 and 1000 Megabits per second, respectively. The preferred embodiment may also be applied to 10 GBase-T, operating at 10 Gbps, which has yet to be fully specified and implemented.

In a preferred embodiment, the monitor comprises a first parallel data frequency and width adjuster between the first interface and the first programmable logic device, the first parallel data frequency and width adjuster being constructed and arranged to reduce the frequency and to increase the width of parallel data received from the first interface by a predetermined amount prior to said data being passed to the first programmable logic device; and, a second parallel data frequency and width adjuster between the second programmable logic device and the second interface, the second parallel data frequency and width adjuster being constructed and arranged to increase the frequency and to reduce the width of parallel data received from the second programmable logic device by said predetermined amount prior to said data being transmitted to a said network link by the second interface when the network monitor is operating in in-line mode. The adjusting of data frequency and width facilitates the use of low cost programmable logic devices. The cost of a programmable logic device is typically proportional to its speed capability and therefore, programmable logic devices that operate at lower frequencies are cheaper.

Preferably, the first parallel data frequency and width adjuster is provided by a multiplexer and the second parallel data frequency and width adjuster is provided by a demultiplexer.

The network monitor preferably comprises a third parallel data frequency and width adjuster between the second interface and the second programmable logic device, the third parallel data frequency and width adjuster being constructed and arranged to reduce the frequency and to increase the width of parallel data received from the second interface by a predetermined amount prior to said data being passed to the second programmable logic device; and, a fourth parallel data frequency and width adjuster between the first programmable logic device and the first interface, the fourth parallel data frequency and width adjuster being constructed and arranged to increase the frequency and to reduce the width of parallel data received from the first programmable logic device by said predetermined amount prior to said data being transmitted to a said network link by the first interface when the network monitor is operating in in-line mode. The third parallel data frequency and width adjuster is preferably provided by a multiplexer and the fourth parallel data frequency and width adjuster is preferably provided by a demultiplexer.

The network monitor preferably comprises a clock signal provider for providing a clock signal so that data can be clocked through the network monitor. Preferably, the clock signal provider is constructed and arranged to obtain said clock signal by recovering a clock signal from data received at the first and second interfaces respectively. The use of the recovered data clock to clock the data through the network monitor from the input of one channel though to the output of the opposite channel ensures that the data and clock remain synchronised throughout the network monitor. This minimises the skew between the clock and the data. It also removes the requirement for memory based buffering between channels, therefore reducing the component count or logic requirement inside the programmable logic devices.

Preferably, each programmable logic device is a field programmable gate array.

According to a second aspect of the present invention, there is provided a method of monitoring data on a network link, the method comprising: receiving data in serial form from a network link; converting the data in serial form to data in parallel form; passing the parallel data to a first programmable logic device for processing for network analysis purposes; controlling the first programmable logic device such that the method takes place selectively in in-line mode or in end station mode, whereby in in-line mode the first programmable logic device provides a copy of the received parallel data, the copy of the received parallel data being converted to data in serial form, said serial data being transmitted back onto the network link, and whereby in end station mode the first programmable logic device does not provide a copy of the received parallel data for conversion into serial form and transmission back onto the network link.

The method preferably comprises, after converting the data in serial form to data in parallel form, reducing the frequency and increasing the width of the parallel data by a predetermined amount prior to said parallel data being passed to the first programmable logic device; and, when operating in in-line mode, increasing the frequency and reducing the width of the copy of the parallel data by the predetermined amount prior to the copy of the parallel data being converted to data in serial form for transmission back onto the network link.

The method preferably comprises recovering a clock signal from the data received in serial form from the network link and using the recovered clock signal when operating in in-line mode to clock the data throughout the step of converting of the data in serial form to the data in parallel form to the step of transmitting serial data being back onto the network link.

Figure 1B:
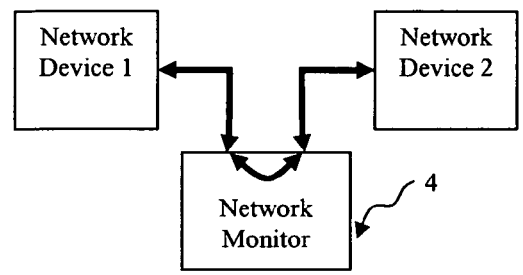
Figure 1C:
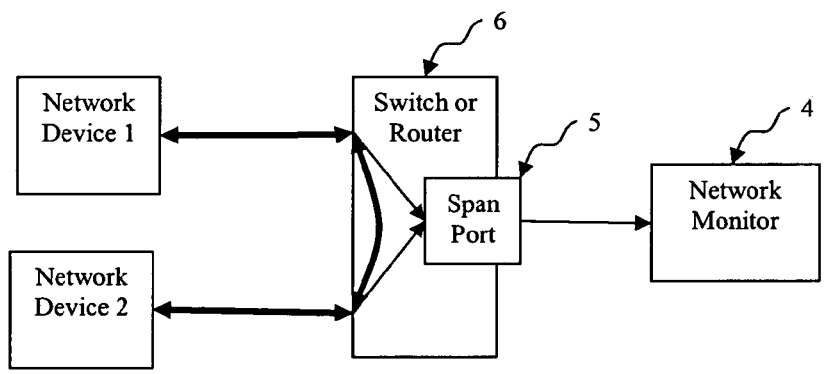
Figure 3A:
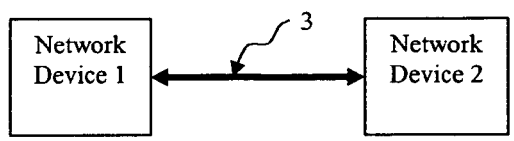
Figure 3B:
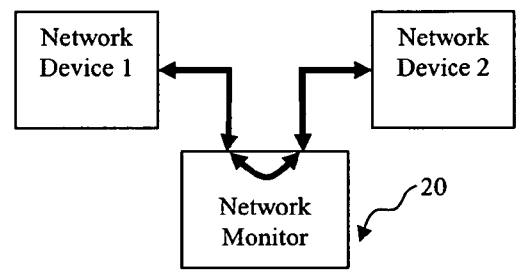
Figure 3C:
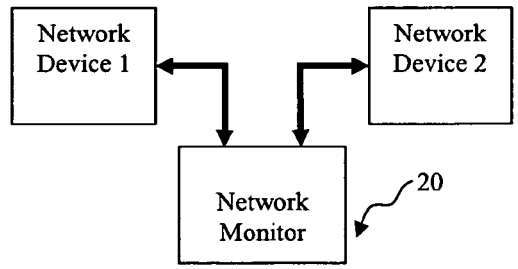
Figure 4:
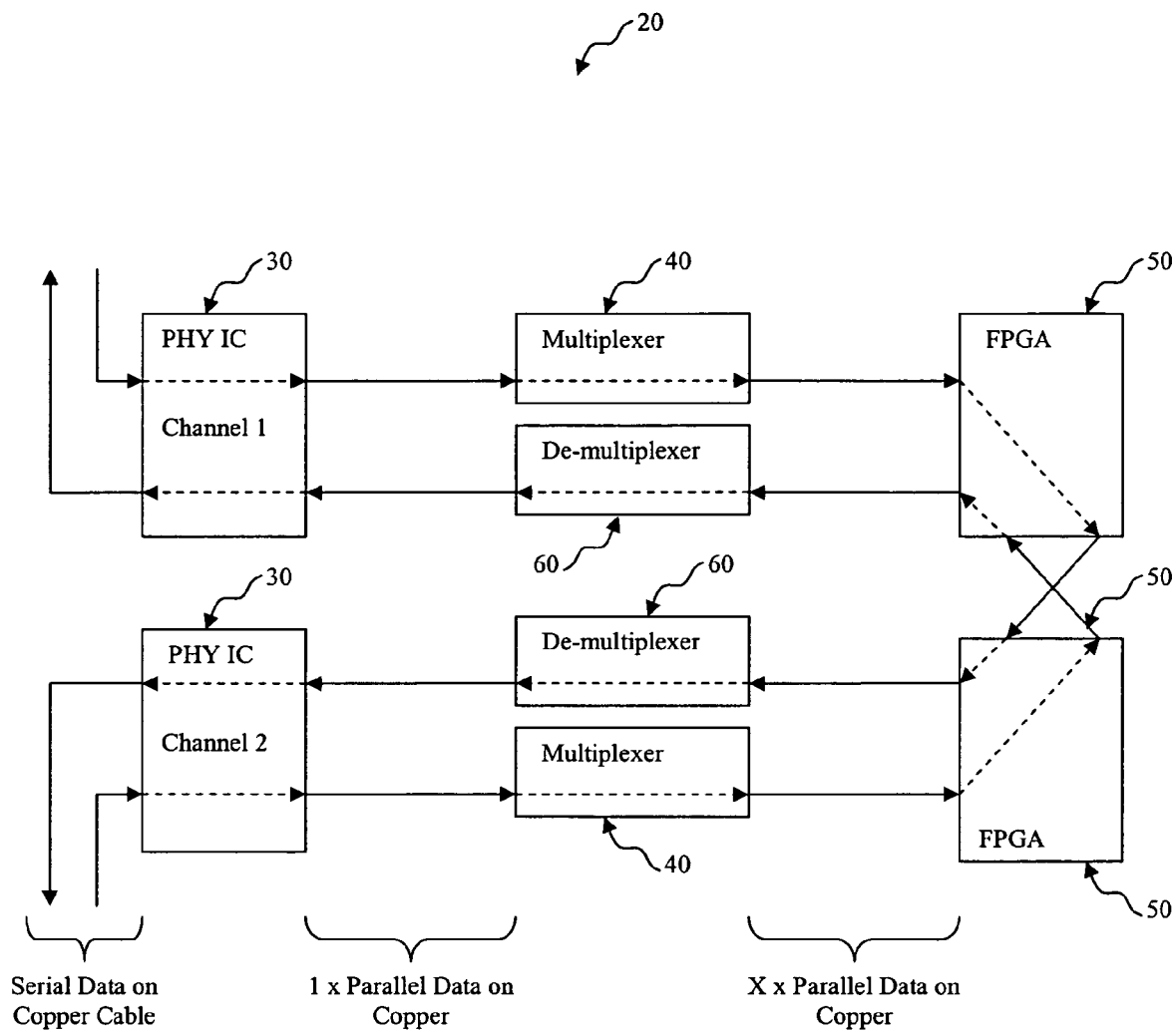
Figure 5:
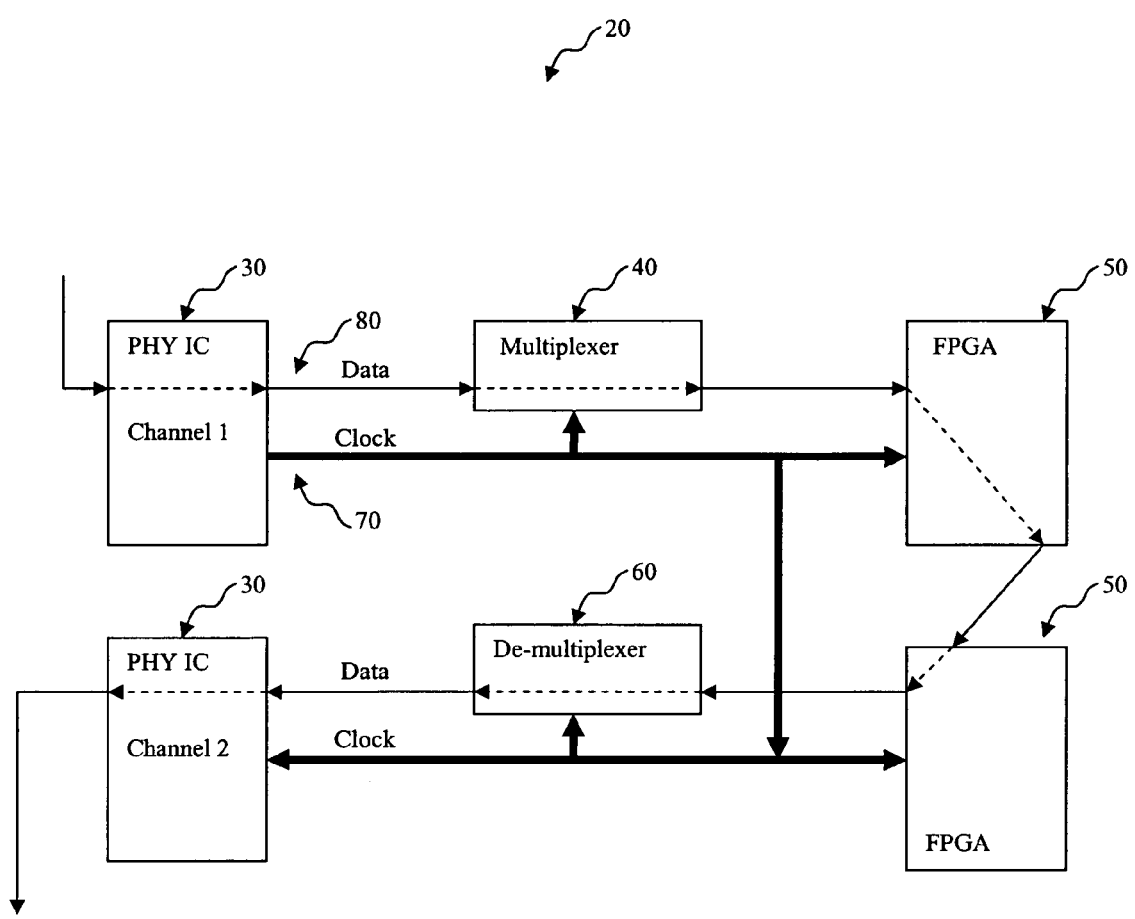

Embodiments of the present invention will now be described by way of example with reference to the accompanying drawings, in which:

FIGS. 1(*a*) to 1(*c*) respectively show schematically two network devices connected by a network link, an in-line connection of a network monitor between the two network devices, and the connection of the network monitor to the span port output of a network switch or router, all as known in the prior art;

FIG. 2 shows schematically a block circuit diagram of a prior art network monitor;

FIGS. 3(*a*) to 3(*c*) respectively show schematically two network devices connected by a link, an in-line connection of an example of a network monitor according to an embodiment of the present invention between the two network devices, and operation of the network monitor in end station mode;

FIG. 4 shows schematically a block circuit diagram of a network monitor according to an embodiment of the present invention; and, FIG. 5 shows schematically an example of the clocking of data through a network monitor according to an embodiment of the present invention.

Referring now to FIG. 3, in FIG. 3(*a*) there is shown two network devices 1,2 connected by a link 3. In FIG. 3(*b*) there is shown an in-line connection of an example of a network monitor 20 according to an embodiment of the present invention between the two network devices 1,2. Once inserted, the network monitor 20 is capable of disconnecting the in-line link to enable operation in end station mode as shown in FIG. 3(*c*).

Referring now to FIG. 4, the network monitor 20 uses two identical circuits, referred to as Channel 1 and Channel 2, to tap data from the network. The network monitor 20 uses pairs of four different functional blocks to implement each of these circuits as shown in FIG. 4. These blocks are a physical layer IC 30, a multiplexer 40, field programmable gate array (FPGA) 50, and a e-multiplexer 60.

The physical layer (PHY) IC 30 provides the interface to the physical layer of the monitored network. The PHY IC 30 is preferably a multi-speed Ethernet PHY IC, which provides speed negotiation and signalling changes between the various speeds available on Ethernet. The PHY IC 30 performs serial-to-parallel conversion of the data entering the network monitor 20 from the network link. The PHY IC 30 also performs parallel-to-serial conversion of the data that is to be transmitted back onto the network link from the network monitor 20. The line-side and system-side interfaces of the PHY IC 30 may be industry standard. In practice, the PHY IC 30 may be changed to support different physical layers. The use of standard PHY ICs 30 provide a cost-effective method of providing an interface that allows the network monitor 20 to be interfaced with a network link operating at several different speeds with different signalling technologies.

The multiplexer 40 interfaces the received parallel data from the PHY IC 20 to the FPGA 50. The multiplexer 40 applies a conversion factor X to the received data. In particular, the multiplexer 40 decreases the frequency of the data by X times and also increases the width of the data words by X times. For example, if data is transmitted into the multiplexer 40 where X=2, then 10-bit words at a frequency of 125 MHz are output as 20-bit words at a frequency of 62.5 MHz. The conversion factor is chosen so that the frequency of the data matches the capabilities of the chosen FPGA 50. This adjusting of the data frequency and width facilitates the use of low cost FPGAs 50. The cost of an FPGA is approximately proportional to its speed capability and thus FPGAs that operate at lower frequencies are cheaper. This method of decreasing the frequency by X and increasing the word width by X results in no loss of bandwidth.

The FPGA 50 processes the data passed to it by the multiplexer 40. The FPGA 50 takes a copy of the data which it has been passed for processing purposes. The FPGA 50 passes a copy of the data to the FPGA 50 on the opposite channel if the network monitor 20 is operating in in-line mode. If required, the FPGA 50 on the opposite channel buffers the received data when the monitor 20 is operating in in-line mode. In this mode, the FPGA 50 on the opposite channel outputs the received parallel data to its associated de-multiplexer 60 for retransmission onto the network link.

When the monitor 20 is not operating in in-line mode, a control signal is sent to each FPGA 50 to reconfigure it such that a copy of the data received at each FPGA 50 from a channel is not passed to the other FPGA 50. In this way, the network monitor 20 can act as an end station for two channels simultaneously.

The use of FPGAs 50, or some other functionally equivalent programmable logic device, to perform the data connection between the two channels provides flexible control over the routing of the data through the network monitor 20 and thus allows the network monitor 20 to switch dynamically between in-line and end station modes. This is due to the flexibility provided by the reconfigurability of the FPGAs 50 or other programmable logic devices, allowing their function to be changed during normal operation.

When the network monitor 20 is operating in in-line mode, the de-multiplexer 60 interfaces the parallel data received from the FPGA 50 to the PHY IC 30. The de-multiplexer 60 increases the frequency of the data by X times and decreases the width of the data words by X times. For example, if data is transmitted into the de-multiplexer 60 where X=2, then 20-bit words at a frequency of 62.5 MHz are output to the PHY IC as 10-bit words at a frequency of 125 MHz. This method of increasing the frequency by X and decreasing the word width by X results in no loss of bandwidth.

The conversion factor X of the de-multiplexer 60 and the multiplexer 40 should be the same to ensure that the retransmitted data rate matches the received data rate.

In a preferred embodiment, a synchronous clock signal is used to clock the data 80 through each of the aforementioned functional blocks 30-60. A clock signal 70 can be provided by the PHY IC 30, which recovers a clock signal from the data 80 received from the network link. This recovered data clock, and/or its derivatives, is used to clock the data 80 through each of the four functional blocks 30-60, before clocking the data 80 into the PHY IC 30 of the opposite channel for retransmission back onto the network link. FIG. 5 shows the flow of the clock signal 70 from Channel 1 to Channel 2 of the network monitor 20. The same arrangement is used to clock the transfer of data from Channel 2 to Channel 1. The frequency of the clock signal 70 may be decreased or increased by the conversion factor X as required in order to match changes in the frequency of the data 80 as it passes through each block 30-60. This use of the received data clock to clock the data through every stage of the network monitor 20 removes the need for re-timing the data. This is particularly valuable when the network monitor 20 is connected to a 1000 Base-T network. This arrangement minimises the skew between the clock and the data and removes the requirement for memory based buffering between channels, therefore reducing the component count or logic requirement inside the FPGAs 50.

The flow of the clock signal 70 to the opposite channel only occurs during in-line mode. When the network monitor 20 is operating in end station mode, the clocks of the two channels are independent of each other.

Embodiments of the present invention have been described with particular reference to the examples illustrated. However, it will be appreciated that variations and modifications may be made to the examples described within the scope of the present invention. For example, the multiplexer and de-multiplexer blocks 40,60 could be replaced by programmable logic devices, such as FPGAs, though FPGAs that can operate at the speed required of these functional blocks are relatively expensive.

The invention claimed is:

1. A network monitor that taps data from a network link between two network devices, the network monitor comprising:

first and second interfaces that allow the network monitor to be connected in-line in a network link between two network devices and to receive serial data therefrom and to transmit serial data thereto, each interface providing for serial-to-parallel conversion of data such that serial data received from a said network link at the interface is output as parallel data, and each interface providing for parallel-to-serial conversion of data such that parallel data received at the interface is output as serial data for transmission to a said network link; and, first and second programmable logic devices, the first programmable logic device being arranged to receive parallel data output by the first interface and to process said data for network analysis purposes, the second programmable logic device being arranged to receive parallel data output by the second interface and to process said data for network analysis purposes, each programmable logic device being controllable so as to selectively pass a copy of the received parallel data to the other programmable logic device so that the network monitor can operate in in-line mode and not to pass a copy of the received parallel data to the other programmable logic device so that the network monitor can operate in end station mode, the second programmable logic device being arranged to pass the copy of the parallel data received from the first programmable logic device to the second interface for parallel-to-serial conversion and for transmission of the serial data back to a said network link when the network monitor is operating in in-line mode, the first programmable logic device being arranged to pass the copy of the parallel data received from the second programmable logic device to the first interface for parallel-to-serial conversion and for transmission of the serial data back to a said network link when the network monitor is operating in in-line mode.

2. A network monitor according to claim 1, comprising:
a first parallel data frequency and width adjuster between the first interface and the first programmable logic device, the first parallel data frequency and width adjuster being constructed and arranged to reduce the frequency and to increase the width of parallel data received from the first interface by a predetermined amount prior to said data being passed to the first programmable logic device; and,
a second parallel data frequency and width adjuster between the second programmable logic device and the second interface, the second parallel data frequency and width adjuster being constructed and arranged to increase the frequency and to reduce the width of parallel data received from the second programmable logic device by said predetermined amount prior to said data being transmitted to a said network link by the second interface when the network monitor is operating in in-line mode.

3. A network monitor according to claim 2, wherein the first parallel data frequency and width adjuster is provided by a multiplexer and the second parallel data frequency and width adjuster is provided by a demultiplexer.

4. A network monitor according to claim 2, comprising:
a third parallel data frequency and width adjuster between the second interface and the second programmable logic device, the third parallel data frequency and width adjuster being constructed and arranged to reduce the frequency and to increase the width of parallel data received from the second interface by a predetermined amount prior to said data being passed to the second programmable logic device; and,
a fourth parallel data frequency and width adjuster between the first programmable logic device and the first interface, the fourth parallel data frequency and width adjuster being constructed and arranged to increase the frequency and to reduce the width of parallel data received from the first programmable logic device by said predetermined amount prior to said data being transmitted to a said network link by the first interface when the network monitor is operating in in-line mode.

5. A network monitor according to claim 4, wherein the third parallel data frequency and width adjuster is provided by a multiplexer and the fourth parallel data frequency and width adjuster is provided by a demultiplexer.

6. A network monitor according to claim 1, comprising a clock signal provider for providing a clock signal so that data can be clocked through the network monitor.

7. A network monitor according to claim 6, wherein the clock signal provider is constructed and arranged to obtain said clock signal by recovering a clock signal from data received at the first and second interfaces respectively.

8. A network monitor according to claim 1, wherein each programmable logic device is a field programmable gate array.

9. A network monitor according to claim 3, comprising:
a third parallel data frequency and width adjuster between the second interface and the second programmable logic device, the third parallel data frequency and width adjuster being constructed and arranged to reduce the frequency and to increase the width of parallel data received from the second interface by a predetermined amount prior to said data being passed to the second programmable logic device; and,
a fourth parallel data frequency and width adjuster between the first programmable logic device and the first interface, the fourth parallel data frequency and width adjuster being constructed and arranged to increase the frequency and to reduce the width of parallel data received from the first programmable logic device by said predetermined amount prior to said data being transmitted to a said network link by the first interface when the network monitor is operating in in-line mode.

10. A method of monitoring data on a network link, the method comprising:
receiving data in serial form from a network link;
converting the data in serial form to data in parallel form;
passing the parallel data to a first programmable logic device for processing for network analysis purposes;
controlling the first programmable logic device such that the method takes place selectively in in-line mode or in end station mode,
whereby in in-line mode the first programmable logic device provides a copy of the received parallel data, the copy of the received parallel data being converted to data in serial form, said serial data being transmitted back onto the network link, and
whereby in end station mode the first programmable logic device does not provide a copy of the received parallel data for conversion into serial form and transmission back onto the network link.

11. A method according to claim 10, comprising:
after converting the data in serial form to data in parallel form, reducing the frequency and increasing the width of the parallel data by a predetermined amount prior to said parallel data being passed to the first programmable logic device; and,
when operating in in-line mode, increasing the frequency and reducing the width of the copy of the parallel data by the predetermined amount prior to the copy of the parallel data being converted to data in serial form for transmission back onto the network link.

12. A method according to claim 10, comprising recovering a clock signal from the data received in serial form from the network link and using the recovered clock signal when operating in in-line mode to clock the data throughout the step of converting of the data in serial form to the data in parallel form to the step of transmitting serial data being back onto the network link.

13. A method according to claim 11, comprising recovering a clock signal from the data received in serial form from the network link and using the recovered clock signal when operating in in-line mode to clock the data throughout the step of converting of the data in serial form to the data in parallel form to the step of transmitting serial data being back onto the network link.

* * * * *